W. A. VAN BRUNT.
GRAIN DRILL.
APPLICATION FILED AUG. 10, 1910.
1,018,220.
Patented Feb. 20, 1912.
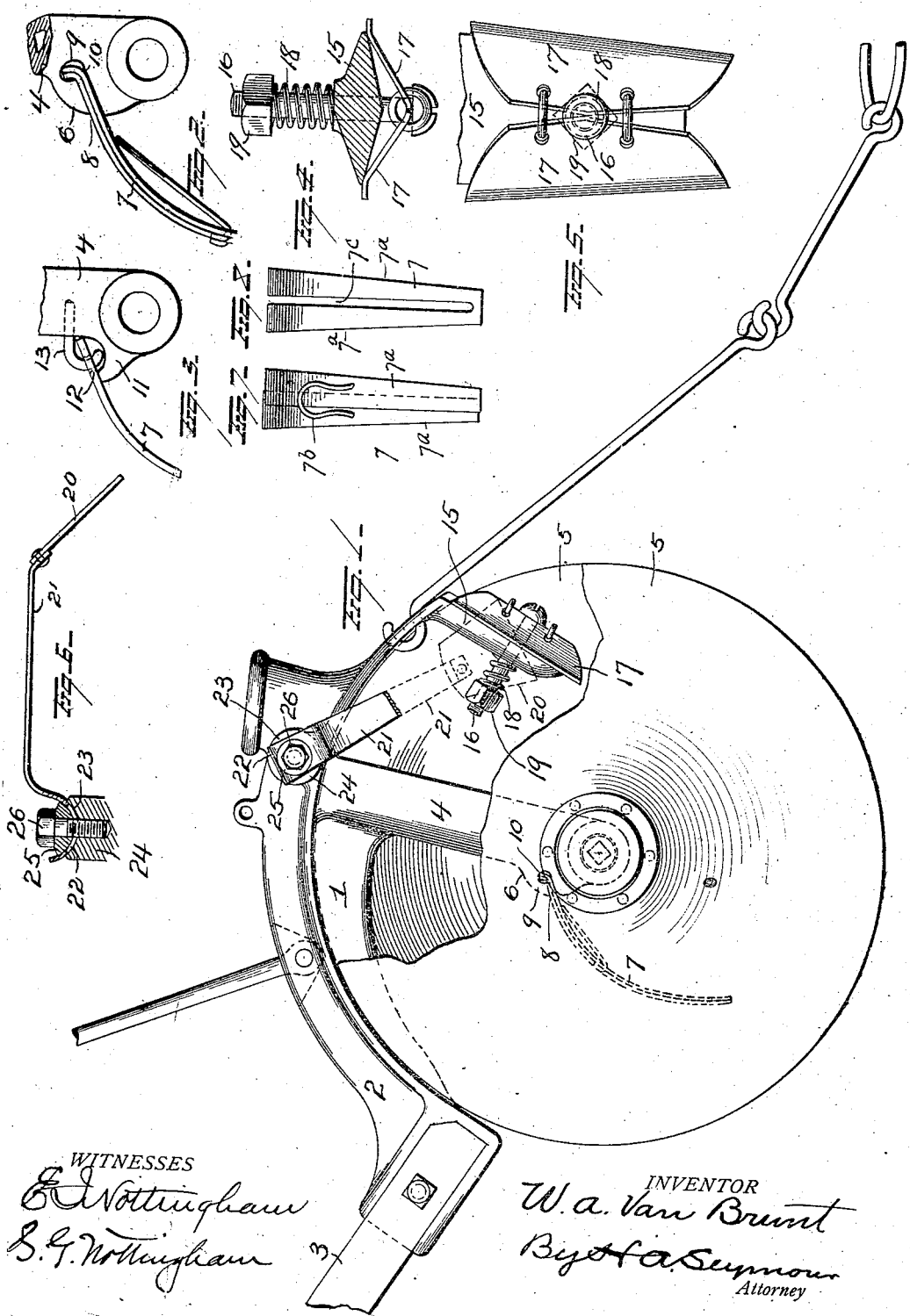

UNITED STATES PATENT OFFICE.

WILLARD A. VAN BRUNT, OF HORICON, WISCONSIN.

GRAIN-DRILL.

1,018,220.

Specification of Letters Patent.

Patented Feb. 20, 1912.

Application filed August 10, 1910. Serial No. 576,501.

*To all whom it may concern:*

Be it known that I, WILLARD A. VAN BRUNT, of Horicon, in the county of Dodge and State of Wisconsin, have invented certain new and useful Improvements in Grain-Drills; and I do hereby declare the following to be a full, clear, and exact description of the invention, such as will enable others skilled in the art to which it appertains to make and use the same.

This invention relates to improvements in grain drills and more particularly to scraping devices for drills of the double or twin-disk type, one object of the invention being to so construct and arrange a scraper as to remove deposit forwardly and downwardly from the central portions of the disks.

A further object is to provide a scraper for the inner faces of twin-disks, which will operate forwardly of the axes of the disks to remove deposits from the inner faces of the latter in a forward and downward direction toward the peripheral portions of the disks, and to so mount said scraper that it will adapt itself to slight changes of positions of the disks relatively to each other during the operation of the drill, and thus insure proper relation of the scraper to the inner faces of the disks without liability of binding.

A further object is to provide twin-disks with a forward scraper for the central portions of the disks and a rear scraper for the outer portions of the inner faces of the disks, and to so construct and arrange said scrapers that they will operate effectually to remove deposit from the major portions of the inner faces of both disks and permit said deposit to drop into the furrow.

With these and other objects in view the invention consists in certain novel features of construction and combinations of parts as hereinafter set forth and pointed out in the claims.

In the accompanying drawings, Figure 1 is a view in elevation with one of the disks broken away. Fig. 2 is a detail view showing mounting of the forward scraper. Fig. 3 is a modification of said mounting. Figs. 4 and 5 are detail views showing the rear scrapers. Fig. 6 is a view showing an outside scraper and its mounting. Fig. 7 is a detail view of the forward scraper, and Fig. 8 is a modified form of forward scraper.

1 represents the disk frame of a grain drill having a forwardly projecting member 2, with which the draw-bar 3 is connected and a downwardly projecting standard 4, at the lower end of which twin-disks 5 are mounted. The depending standard 4 is provided at or near its lower end with a lug or enlargement 6 with which the upper end of a forward scraper 7 is connected. This scraper, which is preferably of sheet steel, is made tapering in form and is curved so as to project forwardly and downwardly from its connection with the standard 4 and to engage the inner faces of the respective disks from points near the center of the latter, said scraper being of such length as to terminate an appreciable distance inwardly removed from the peripheral portions of the disks, as clearly shown in Fig. 1. The scraper 7 comprises two members 7ª and these are connected intermediate of their ends by a spring 7ᵇ which tends to press them laterally against the inner faces of the respective disks.

The spring 7ᵇ might be dispensed with and the scraper made in a single piece having a slot 7ᶜ open at its upper end and extending approximately to its lower end. The two scraper members 7ª thus formed will have such lateral resiliency as to cause them to properly engage the inner faces of disks. In order that the scraper 7 shall adapt itself to any slight changes in the angularity of the disks relatively to each other during the operation of the drill, I prefer to connect said scraper with the standard 4 in such manner that it will be permitted to have slight lateral play and yet be prevented from vertical displacement. By thus connecting the scraper 7 with the standard 4, there will be no danger of binding between said scraper and the disks on account of any slight changes of the positions of the disks with relation to each other. The loose connection between the scraper 7 and the standard 4 may be formed in various ways. One manner of effecting this connection is shown in Figs. 1 and 2, wherein the lug or enlargement 6 is illustrated as having a slot 8 for the insertion of the upper end of the scraper and said slot as having an enlarged portion 9 at its upper end for the reception of the bent upper end 10 of the scraper.

In the construction shown in Fig. 3, the lower end of the standard 4 is provided with a lug 11 which forms a seat for the scraper 7 somewhat below the upper end of the latter and the scraper is provided with a hole 12 for the reception of a hook 13 secured to the standard 4. With either of these constructions the scraper 7 can move laterally to adapt itself to changing positions of the disks and will be prevented from longitudinal displacement. As the drill moves forwardly, the scraper 7 will engage deposits on the central portion of the inner faces of the two disks and cause said deposits to be moved forwardly and downwardly toward the peripheral portions of the disks. Some of this deposit thus moved will drop into the furrow but some portions of it may adhere to the inner faces of the disks near the peripheral portions thereof, and this will be subsequently removed by means of rear scrapers,—the construction and arrangement of which will now be explained. The disk frame 1 is provided at its rear end some distance rearwardly of the standard 4, with a depending arm 15 projecting between the two disks. This arm is perforated for the passage of a rod 16, the lower or rear end of which is connected with two scrapers 17 which are hinged together and adapted to engage the outer portions of the inner faces of the two disks. The scrapers 17 bear, short distances removed from their free edges, against the respective edges of the arm 15 and a spring 18, encircling the rod 16, bears at one end against the arm 15 and at its other end against a nut 19 on the rod 16. This spring operates to press the hinged scrapers against the inner faces of the disks and the tension with which these scrapers bear against the disks may be regulated by means of the nut 19.

For the purpose of removing dirt from the outer faces of the disks, scrapers such as shown in Fig. 7 may be employed. Each outer scraper 20 is carried by a spring arm 21 and the latter is provided with a curved member 22 having a seat 23 on a lug 24 projecting from the disk frame 1. The upper face of the curved portion 22 of arm 21 is engaged by a washer 25 having a curved under face. A bolt 26 passes through the washer and the curved portion 22 of arm 21 and enters the lug enlargement 24 for securing the parts in position. It is apparent that by adjusting the curved portion of the spring arm 21 the tension with which the scraper 20 will bear against the outer face of the disk may be adjusted.

Having fully described my invention what I claim as new and desire to secure by Letters-Patent, is,—

1. In a grain drill, the combination with twin disks, of a laterally movable and yielding scraper located between said disks at a point forward of the axle, said scraper being constructed and arranged to project forwardly of and downwardly from the axle, substantially as set forth.

2. In a grain drill, the combination with twin disks, of a laterally movable and yielding curved scraper located between the disks at a point forward of the axle and constructed and arranged to project forwardly of and downwardly from the axle, substantially as set forth.

3. In a grain drill, the combination with twin disks, and a disk frame having a standard depending between the disks and provided with a bearing for the latter, of a curved scraper attached at its upper end to said standard and constructed and arranged to project forward of the axle and downwardly therefrom between the disks, substantially as set forth.

4. The combination with a disk frame and twin disks mounted thereon, of a scraper loosely connected at its upper end with the disk frame and arranged to project forward of and downwardly from the axle on which the disks are mounted, substantially as set forth.

5. The combination with a disk frame and twin disks mounted thereon, of a laterally movable and yielding scraper loosely attached at its upper end to the disk frame, and constructed and arranged to project forward of and downwardly from the axle on which the disks are mounted, substantially as set forth.

6. The combination with a disk frame standard and disks mounted thereon, of a laterally movable and yielding scraper having its upper end attached to the standard, and constructed and arranged to project forward of and downwardly from the axle on which the disks are mounted and clean the central portion of the disks, and rear scrapers constructed and arranged to clean the inner surfaces of the disks near their peripheries, substantially as set forth.

7. The combination with a disk frame; disks mounted thereon, and an arm projecting between the disks, of two scrapers hinged together at their adjacent edges and adapted to engage said arm near their outer edges, a rod mounted in the arm and provided with a head which engages the rear surfaces of the hinged scrapers near their adjacent edges, a spring mounted on the rod and seated at one end on the arm, and a nut on the rod against which the opposite end of the spring is seated, substantially as set forth.

8. The combination with a disk frame, disks mounted thereon and an arm projecting between the disks, of two hinged scrapers constructed to engage said arm near their outer edges, a spring for moving the outer edges of the scrapers away from one another, and an adjustable nut for distending the scrapers, substantially as set forth.

In testimony whereof, I have signed this specification in the presence of two subscribing witnesses.

WILLARD A. VAN BRUNT.

Witnesses:
F. H. CLAUSEN,
H. MARSH.

Copies of this patent may be obtained for five cents each, by addressing the "Commissioner of Patents, Washington, D. C."